United States Patent [19]

Egusa

[11] Patent Number: 4,506,422

[45] Date of Patent: Mar. 26, 1985

[54] METHOD OF PRODUCING BEARING DEVICES FOR WHEELS OF AUTOMOBILES

[75] Inventor: Tomoyoshi Egusa, Iwata, Japan

[73] Assignee: NTN Toyo Bearing Company, Limited, Osaka, Japan

[21] Appl. No.: 420,238

[22] PCT Filed: Jan. 19, 1982

[86] PCT No.: PCT/JP82/00018

§ 371 Date: Sep. 14, 1982

§ 102(e) Date: Sep. 14, 1982

[87] PCT Pub. No.: WO83/02418

PCT Pub. Date: Jul. 21, 1983

[51] Int. Cl.³ .............................................. B21H 1/12
[52] U.S. Cl. ........................ 29/148.4 R; 29/148.4 A; 51/289 R; 51/105 SP; 51/165.91; 51/291; 409/132; 384/450
[58] Field of Search ............... 308/214, 211, 196; 29/148.4 R, 148.4 A, 149.5 R, 402.06; 51/289 R, 105 SP, 165.91, 291, 165 R; 409/131, 132, 149, 150, 151, 166, 168, 153

[56] References Cited

U.S. PATENT DOCUMENTS

| 3,806,214 | 4/1974 | Keiser | 308/211 |
| 4,115,958 | 9/1978 | Englander et al. | 51/289 R |
| 4,177,607 | 11/1979 | Toda | 51/165.91 X |
| 4,274,230 | 6/1981 | Thalheim | 51/165.91 X |
| 4,454,640 | 6/1984 | Egusa et al. | 29/148.4 R X |

FOREIGN PATENT DOCUMENTS

| 1660 | 1/1982 | Japan | 51/165 R |
| 144662 | 9/1982 | Japan | 51/165 R |
| 71062 | 4/1983 | Japan | 51/165 R |
| WO83/01404 | 4/1983 | PCT Int'l Appl. | 51/165 R |

Primary Examiner—Carl E. Hall
Assistant Examiner—John T. Burtch
Attorney, Agent, or Firm—Armstrong, Nikaido, Marmelstein & Kubovcik

[57] ABSTRACT

A method of manufacturing a bearing assembly for the wheels of automobiles, wherein an axle member B is ground by a first step wherein a raceway surface 5 and a cylindrical seat 6 are simultaneously ground, a second step wherein any deviation of the finished raceway diameter from its predetermined size is fed back to a gauge 23 for in-process control which controls the grinding operation on back-face rib surface 21 and shoulder 9, and a third step wherein the back-face rib surface 21 and shoulder 9 are ground simultaneously, while an inner annular member C is ground by a first step wherein a raceway surface 11 is ground, a second step wherein any deviation of the finished raceway diameter from its predetermined size is fed back to a gauge 29 for in-process control which controls the grinding operation on back-face rib surface 21 and front face 10, and a third step wherein the back-face rib surface 21 and front face 10 are ground simultaneously, and the inner annular member B is then fitted on the cylindrical seat 6 of the axle member B until the front face 10 abuts against the shoulder 9. The method eliminates the influences on the internal bearing clearance of the outer peripheral raceway surfaces of the axle member B and inner annular member C.

2 Claims, 5 Drawing Figures

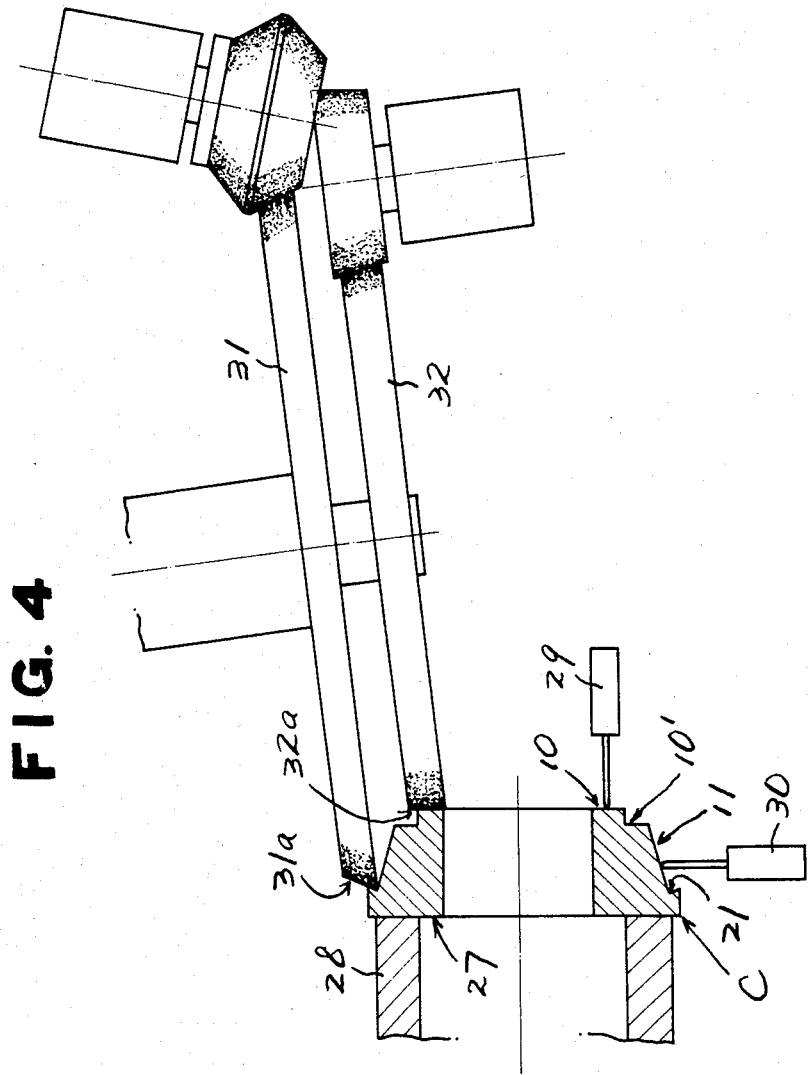

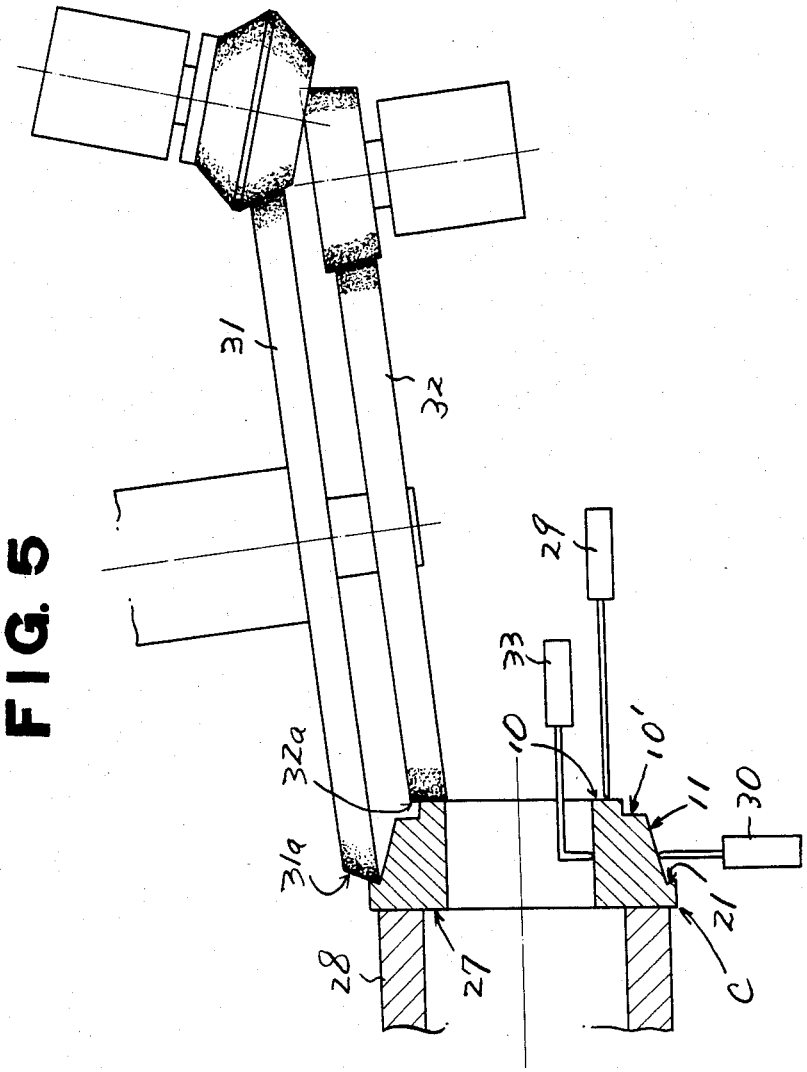

METHOD OF PRODUCING BEARING DEVICES FOR WHEELS OF AUTOMOBILES

This invention relates to a method of producing bearing devices for the wheels of automobiles.

In bearing devices for the wheels of automobiles with which the present invention is concerned, the outer periphery of the outer joint member or shaft member with a flange (hereinafter referred to as shaft member) of a constant velocity joint serves as one of the inner members of the bearing. In such bearing devices, bearing clearance values have major influences on the life of the bearing and on the driving comfortableness of the automobile, so that severity is imposed on said bearing clearance values.

According to conventional methods of producing bearing devices for the wheels of automobiles, however, the grinding operation on the shaft member and inner annular member is such that surfaces, such as the track surface, support surface, step section shoulder surface, step section cylindrical surface, and end surface contacting the step section shoulder, are separately ground by separate grinding stones within respective predetermined target tolerances. As a result, despite the fact that each surface is finished within its predetermined tolerance, the accumulation of variations results in a large range of clearance in the assembled bearings, with some bearings having a smaller clearance than for the intended purpose of use and others having a larger one. Thus, if bearings having a smaller clearance value than for the intended purpose of use are assembled into an automobile, this will result in seizure and premature peeling, decreasing the life of the bearing. Conversely, if the value of the bearing clearance is too large, this will result in rattling or vibration, which is undesirable. Further, since the grinding operation is not such that the correlation between the amounts of deviation of the finish dimension of the respective surfaces is constant, variations in the bearing clearance are produced, making it impossible to control clearances to bring them within a given range.

To eliminate the influences of the outer peripheral track surfaces of the shaft member and inner annular member on the bearing clearance, the conventional production method may be effective to suppress the amount of variation by narrowing the tolerance, but narrowing the tolerance requires severe machining, which lowers productivity and increases the cost of production.

Therefore, in the conventional assembling operation, it has been necessary to prepare numbers of shaft members and inner annular members in advance and select a shaft member and an inner annular member as a pair which provides a given bearing clearance or negative bearing clearance or negative bearing clearance each time a bearing is assembled, thus greatly detracting from bearing assembling efficiency and interchangeability.

In view of the above-described drawbacks to the conventional production method, the present invention provides a method of producing bearing devices for the wheels of automobiles which is intended to eliminate the influences of the outer peripheral track surfaces of the shaft member and inner annular member on the bearing clearance.

To this end, the invention provides a method of producing bearing devices for the wheels of automobiles, which bearing devices comprise an outer member having two track surfaces formed on the inner periphery thereof, a shaft member having formed on the outer periphery thereof one track surface and a support surface for supporting the larger-end surfaces of conical rollers, and two rows of conical rollers disposed between the track surfaces of said outer member and said shaft member and inner annular member, said shaft member being formed with a step section cylindrical surface for receiving said inner annular member, said step section cylindrical surface having the inner annular member fitted thereon, with said inner annular member axially abutting against the shoulder surface of the step section, said method being characterized by the steps of grinding the track surface and step section cylindrical surface of said shaft member simultaneously according to the angular system, feeding the deviation of the finish dimension of said track surface from its target dimension back to an in-process control gauge which controls the grinding of the support surface and step section shoulder surface, thereby grinding the support surface and step section shoulder surface simultaneously according to the angular system, while grinding the track surface of the inner annular member, feeding the deviation of its finish dimension from the target dimension thereof back to an in-process control gauge which controls the grinding of the support surface and the end surface which abuts against the step secion shoulder surface simultaneously according to the angular system, and fitting the inner annular member on the step section cylindrical surface of the shaft member until it abuts against the step section shoulder surface of the shaft member.

According to this invention, so long as shaft members and inner annular members are finished within predetermined tolerances, shaft members and inner annular members, which define peripheral track surfaces, can be combined together at random, and it is possible to eliminate the influences of the outer peripheral track surfaces on the bearing clearance in the assembled bearing, thus increasing bearing assembling efficiency. Further, since the step section cylindrical surface formed on the shaft member for receiving the inner annular member is ground simultaneously with the track surface, there is no danger of misalignment between the two outer peripheral track surfaces. Further, in contrast to the conventional procedure in which the surfaces are separately ground, a plurality of surfaces are simultaneously ground, thus shortening the grinding time, increasing grinding efficiency, and enabling mass-production, thereby providing for the reduction of the cost of production.

In an embodiment of the invention, in simultaneously grinding the support surface of the inner annular member and its end surface abutting against the step section shoulder surface, the bore diameter and the track surface diameter of the inner annular member are measured by a guage, and on the basis of the result of the measurement the support surface of the inner annular member and its end surface abutting against the step section shoulder surface are ground.

Therefore, according to the present invention, in simultaneously grinding the support surface of the inner annular member, and its end surface abutting against the step section shoulder surface, the target finish dimensions thereof are determined on the basis of the deviations of the finish bore diameter and track surface diameter of the inner annular member, so that variations in the diameter of the track surface due to the interference at the time of force-fitting it onto the step section cylindrical surface formed on the shaft member (variations in diameter due to variations in the amount of expansion) can be eliminated, a fact which is suitable for random matching.

These and other objects and features of the invention will become more apparent from the following description given with reference to the accompanying drawings, in which.

FIG. 4 is a diagrammatic view illustrating a concrete example in which an inner annular member is ground by the production method of the invention; and FIG. 5 is a diagrammatic view illustrating a concrete example in which the support surface of an inner annular member and its end surface abutting against a shoulder surface are ground on the basis of the finish dimensions of its bore and track surface according to the production method of the invention.

Figure 1:
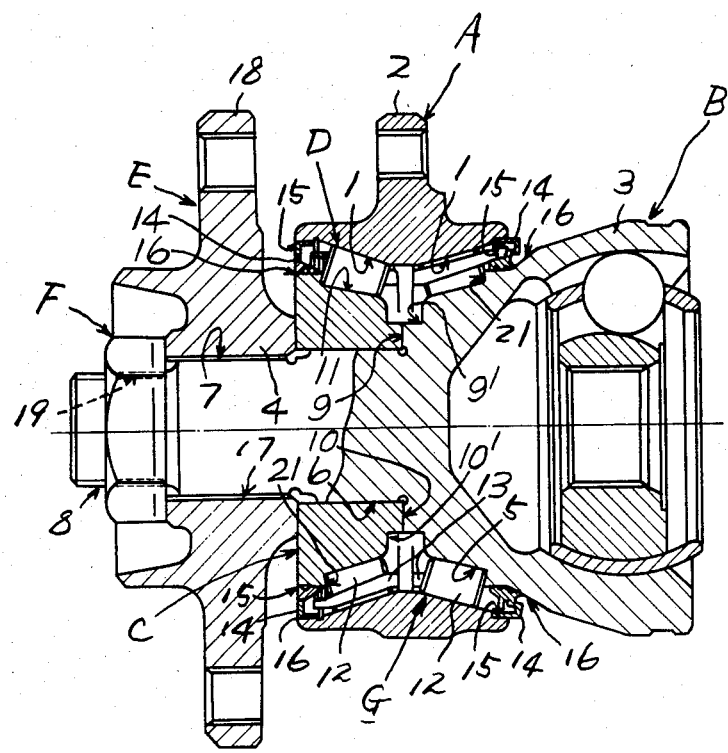
FIG. 1 is an explanatory view showing an example of a bearing device for the wheels of automobiles to which the production method of the invention is applied.

The production method of the invention is applicable to bearing devices for the driving wheels and non-driving wheels of automobiles, and as an example a bearing device for the driving wheels of automobiles is shown in FIG. 1, wherein A denotes an outer member; B denotes a shaft member; C denotes an inner annular member; D denotes two rows of rolling bodies; E denotes a hub; and F denotes a nut member.

The outer member A is disposed around the outer periphery of the shaft member B and is formed on its inner periphery with inner peripheral track surfaces 1 for supporting the two rows of rolling bodies D and externally with a flange 2 for attachment to a vehicle.

The shaft member B, in this embodiment, is the outer joint member of a constant velocity universal joint, comprising an axially extending shaft portion 4 integrally formed on the closed end of a bowl-shaped portion 3, whose outer peripheral surface is formed with an outer peripheral track surface 5 supporting one of the two rows of rolling bodies D and a support surface 21 for supporting the large-end surfaces of conical rollers 12 to be later described, wherein the outer peripheral surface of the shaft portion 4 is formed with a step section cylindrical surface 6 on which the inner annular member C is force-fitted and serrations or splines 7 for receiving the hub E thereon to provide for transmission of power in the rotative direction, the outer peripheral surface of the front end portion being formed with a threaded portion 8 for threadedly receiving the nut member F thereon. The numeral 9 denotes a step section shoulder surface formed in the boundary between the bowl-shaped portion 3 and the shaft portion 4, serving as an abutment surface for abutting against the end surface 10 of the inner annular member C to provide for the axial positioning of the inner annular member C. The step section shoulder surface 9 has its diametrical dimension (the amount of rise) reduced and is formed with a relief 9' to improve the accuracy or right angularity with respect to the shaft portion 4.

The inner annular member C is formed on its outer periphery with an outer peripheral track surface 11 for supporting the other row of rolling bodies D and with a support surface 21 for supporting the larger-end surfaces of conical rollers 12 to be later described and is force-fitted on the step section surface 6 of the shaft member B until the abutting end surface 10 abuts against the step section shoulder surface 9 of the shaft member B so as to maintain said end surface in constant positional relation to the outer peripheral track surface 5 of the shaft member B and its support surface 21 which supports the larger-end surfaces of the conical rollers 12. In addition, the abutting end surface 10 is formed with a relief 10' as in the case of the relief 9' in the step section shoulder surface 9 of the shaft member B.

The two rows of rolling bodies B are in the form of two rows of conical rollers 12 held in retainers 13 between the inner peripheral track surfaces 1 of the outer member A and the outer peripheral track surfaces 5 and 11 of the shaft member B and inner annular member C, thereby forming a double-row conical roller bearing G. In addition, the numeral 14 denotes seal members disposed between seal surfaces 15 formed on the inner periphery of the outer member A and seal surfaces 16 formed on the outer peripheries of the shaft member B and inner annular member C, for sealing between the outer member A and the shaft member B and inner annular member C.

The hub E is fitted on the shaft portion 4 of the shaft member B and is formed on its inner periphery with a serrated or splined fitting portion 17 for engagement with the serrations or splines 7 formed on its outer periphery with a flange 18 for attachment to a wheel.

The nut member F has on its inner peripheral surface a threaded fitting portion 19 for threaded engagement with the threaded portion of the front end of the shaft member B. By threadedly fitting the threaded fitting portion 19 on the threaded portion 8 of the front end of the shaft member B, the hub E and the bearing G are integrally joined to the shaft member B and the bearing clearance and negative bearing clearance are determined.

In the bearing device of the construction described above for the driving wheels of automobiles, since the outer periphery of the bowl-shaped portion 3 of the shaft member B serves as one of the inner members of the bearing G, the construction of the bearing G and parts associated with the bearing G is simplified and the entire bearing device is small in size and light in weight, making it possible to reduce the number of steps of assembling operation.

Figure 2:
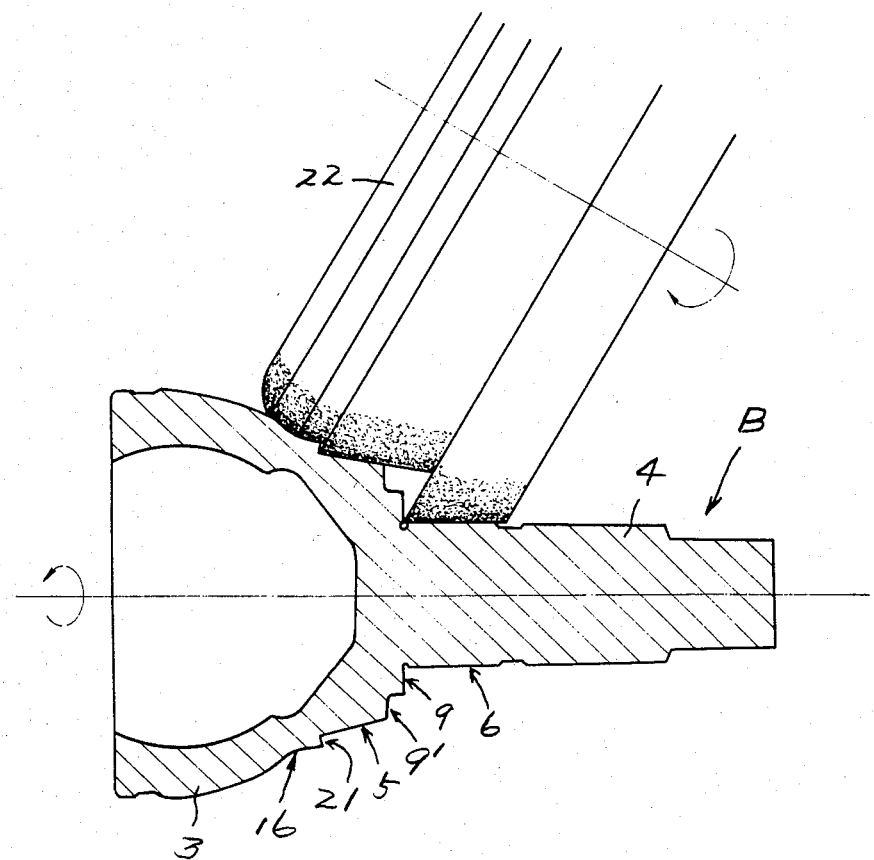
FIGS. 2 and 3 are diagrammatic views illustrating the manner of grinding a shaft member by the production method of the invention.
Figure 3:
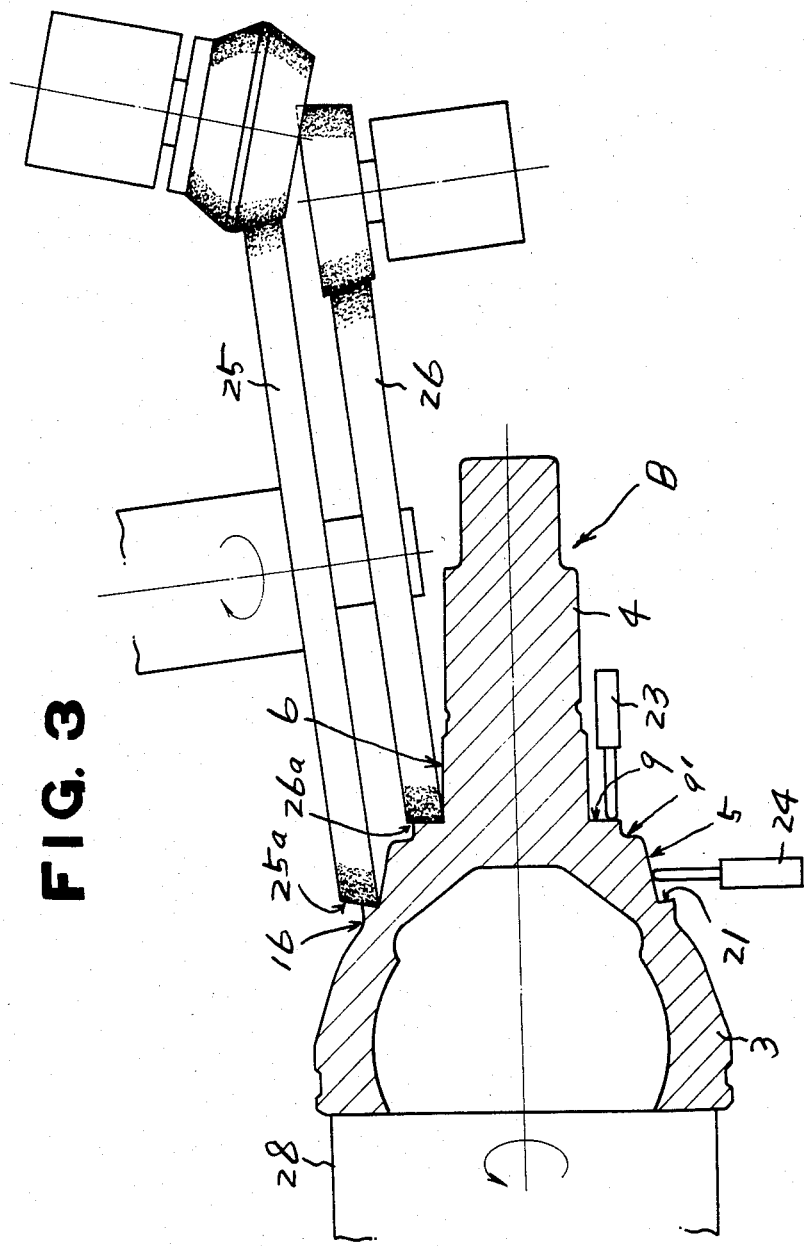

FIGS. 2 and 3 show a concrete example of the grinding of the shaft member B, illustrating the first and the second step, respectively.

In the grinding of the shaft member B, subsequent to forging in the first step shown in FIG. 2, the forged shaft member B is supported by the usual two-center support system or magnet chuck shoe support system and the track surface 5, step section cylindrical surface 6 and seal surface 16 are simultaneously ground by a shaft grinding stone 22 and according to the usual angular grinding system, thereby securing alignment of the step section cylindrical surface 6 and seal surface 16 with respect to the track surface 5 and grinding the track surface 5 of the shaft member B within the target dimension. Subsequently, in the second step shown in FIG. 3, a first guage 23 for in-process control for controlling the grinding operation is applied to the step section shoulder surface 9 of the shaft member B and a second guage 24 to the track surface 5 so as to measure the width of the shaft member B (the axial dimension between the surface of a backing plate 28 and the step section shoulder surface 9) and the diameter of the track surface 5. In addition, the first guage 23 may be brought into contact with the support surface 21. The deviation of the diameter of the track surface 5 (machining error) as measured by the second guage (the actual finish dimension machined in the first step) from the reference diameter of the track surface 5 (the target design diameter of the track surface) is found and then converted into a deviation in the axial direction of the shaft member (an amount of influence of the variations in the track surface diameter on the axial clearance), the converted value being fed back to the first guage 23, and then the support surface 21 supporting the larger-end surfaces of the conical rollers 12 and the step section surface 9 of the shaft member B are simultaneously ground by a support surface grinding stone 25 and a step section shoulder surface grinding stone 26 until the value being measured by the zero-calibrated first guage 23 adjusted by means of the amount of influence reaches the predetermined value for the shaft member width. In addition, the grinding stones 25 and 26 are coaxially and integrally attached to a common spindle such that the respective working faces 25a and 26a are spaced apart from each other by the dimension between the support surface 21 and the step section shoulder 9.

With the track surface 5, support surface 21, step section shoulder surface 9 and step section cylindrical surface 6 of the shaft member B thus ground, it follows that the axial dimensions between the step section shouler surface 6 and the track surface 5 and between the step section shoulder surface 10 and the support surface 21 and the diametrical dimension of the step section cylindrical surface 6 have been set in connection with the diametrical dimension of the track surface (in other words, the dimensions of the track surface 5, support surface 21 and step section cylindrical surface 6 based on the step section shoulder surface 9 are maintained constant).

FIG. 4 shows a concrete example of the grinding operation on the inner annular member C, wherein the grinding of the inner annular member C is performed by grinding the track surface 11 to the target finish dimension based on the end surface 27 opposite to the abutting end surface 10 of the inner annular member C irrespective of the width of the workpiece (the axial dimension from the end surface of the backing plate 28 to the abutting end surface 10), causing the backing plate 28 to attract the end surface 27 opposite to the abutting end surface 10 of the inner annular member C, applying a first gauge 29 for in-process control which controls the grinding operation, applying a second gauge 30 to the track surface 11, and measuring the width of the inner annular member C (the axial dimension between the backing plate 28 and the abutting end surface 10) and the diametrical dimension of the track surface 5. In addition, the first gauge 29 may be applied to the support surface 21. Then, the deviation of the diametrical dimension of the track surface 11 (machining error) as measured by the second guage 30 (the actual finish dimension machined in advance) from the reference diametrical dimension of the track surface 11 (the target design diametrical dimension) is found and is then converted into a deviation in the axial direction of the inner annular member C (an amount of influence of the variations in the track surface diameter on the axial clearance), the converted value being fed back to the first gauge 29, and then the support surface 21 and the abutting end surface 10 of the inner annular member C are simultaneously ground by a support surface grinding stone 31 and an end surface grinding stone 32 until the value being measured by the zero-calibrated first gauge 29 adjusted by means of said amount of influence reaches the predetermined value for widthwise dimension of the inner annular member. In addition, the grinding stones 31 and 32 are coaxially and integrally attached to a common spindle such that they are spaced a predetermined distance apart, as in the case of the grinding stones 25 and 26.

With the track surface 11, support surface 21 and abutting end surface 10 of the inner annular member C thus ground, it follows that the axial dimensions between the abutting end surface 10 and track surface 11 and between the abutting end surface 10 and support surface 21 have been set in connection with the diameter of the track surface 11 (in other words, the dimensions of the track surface 11 and support surface 21 based on the abutting end surface 10 are maintained constant).

The inner annular member C thus ground is then force-fitted on the step section cylindrical surface 6 of the shaft member B until the abutting end surface 10 abuts against the step section shoulder surface 9 of the shaft member B ground in the manner descirbed above, so that the axial distance between the outer peripheral track surfaces 5, 11 and the support surfaces 21 is always constant, which means that combinations of shaft members B and inner annular members C at random are allowed. Further, since the step section shoulder surface 9, abutting end surface 10 and support surface 21 are ground in such a manner as to cancel the influences of the variations in the finish dimensions of the outer peripheral track surfaces 5, 11 on the bearing clearance, it is possible to eliminate the influences of the variations in the finish dimensions of the outer peripheral track surfaces 5, 11 on the bearing clearance.

In addition, FIG. 5 is a concrete example of the grinding operation on the inner annular member C, including a third gauge 33 for measuring the bore of the inner annular member C. Thus, the deviation of the bore dimension of the inner annular member C from the target finish dimension is found by using said third guage 33. The amount of variation in the diametrical dimension of the track surface 11 caused by said deviation during force-fitting onto the step section cylindrical surface is fed back to the first guage 29 with consideration given to the deviation of the track surface 11 measured by the second gauge 30, thereby correcting the target finish dimensions of the support surface 21 and abutting end surface 16 of the inner annular member C.

While the above embodiment has been described with reference to a case where the bore of the inner annular member is ground in advance, it is also possible to grind the bore by a separate grinding stone simultaneously with the grinding of the track surface 11 of the inner annular member C.

Further, the grinding stones 22, 25 and 26, 31 and 32 used in grinding the shaft member B and the inner annular member C each may be a one-piece grinding stone or a grinding stone assembly comprising a plurality of grinding stones coaxially put together on a single spindle.

As many apparently widely different embodiments of this invention may be made without departing from the spirit and scope thereof, it is to be understood that the invention is not limited to the specific embodiments thereof except as defined in the appended claims.

What is claimed is:

1. A method of manufacturing a bearing assembly for the wheels of automobiles, which bearing assembly comprises an outer member having two raceway surfaces formed on its inner periphery, an axle member having formed on its outer periphery a raceway surface and a back-face rib surface for supporting large end faces of tapered rollers, an inner annular member having formed on its outer periphery another raceway surface and a backface rib surface for supporting large end faces of tapered rollers, and two rows of tapered rollers interposed between the raceway surfaces of said outer member, said axle member and said inner annular member, said axle member being formed with a cylindrical seat on which the inner annular member is fitted with said inner annular member in contact with a shoulder formed at one end of the cylindrical seat, said method being characterized by the steps of grinding the raceway surface and the cylindrical seat of said axle member simultaneously by a grinding wheel; feeding any deviation of the finished raceway diameter of said axle member from its predetermined size back to an in-process control gauge which controls the grinding operation for the back-face rib surface and the shoulder; thereby grinding the back-face rib surface and the shoulder simultaneously by a grinding wheel; while grinding the raceway surface of the inner annular member; feeding any deviation of the finished raceway diameter of said inner annular member from its predetermined size back to an in-process control guage which controls the grinding operation for the back-face rib surface and a front face on which the inner annular member abuts against the shoulder; thereby grinding the back-face rib surfce and the front face simultaneously by a grinding wheel; and fitting the inner annular member on the cylindrical seat of the axial member until it abuts against the shoulder.

2. A method as set forth in claim 1, characterized in that in simultaneously grinding the back-face rib surfce and the front face of the inner annular member, the stock removal therefor is determined on the basis of the results of the finished diameters of the bore and the raceway of said inner annular member.

* * * * *